Patented Sept. 8, 1931

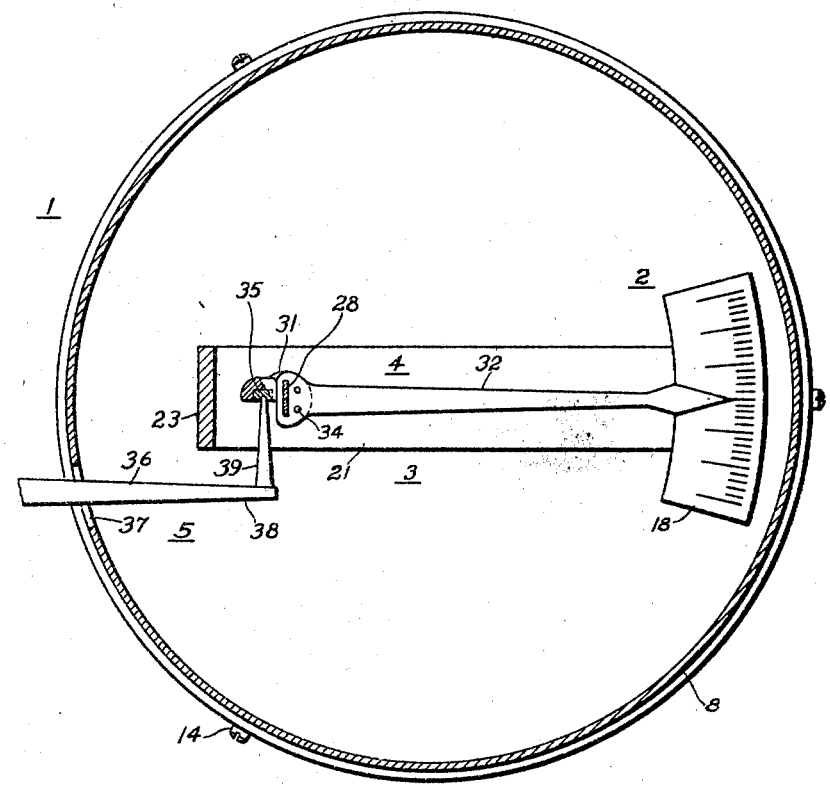

1,822,118

UNITED STATES PATENT OFFICE

WILLIAM E. TRUMPLER, OF WILKINSBURG, PENNSYLVANIA, ASSIGNOR TO WESTINGHOUSE ELECTRIC & MANUFACTURING COMPANY, A CORPORATION OF PENNSYLVANIA

VIBRATION INDICATOR

Application filed June 27, 1925. Serial No. 39,995.

My invention relates to vibration indicators and particularly to indicators employed in the testing of machines, as in determining the dynamic unbalance of rotating elements.

One object of my invention is to provide an indicator of the above indicated character, that shall be substantially free of friction.

Another object of my invention is to provide a vibration indicator that shall be sensitively responsive to minute vibration and that shall magnify the indications thereof.

Another object of my invention is to provide a vibration indicator embodying a resilient torsional shaft element that shall be reinforced against longitudinal bending.

Another object of my invention is to provide indicating and actuating elements for a vibration indicator that shall be resiliently biased toward each other and so adjustable relative to each other between a dial and a machine to be tested as to improve the operation of the device and facilitate its manipulation.

Another object of my invention is to provide a novel means for so applying the force of an actuating element to an indicating element through portions having rolling substantially point contact as to materially improve the operation of sensitive instruments.

Another object of my invention is to so apply an actuating force to an indicating element substantially tangentially to the arcuate path of movement of the latter as to assist in improving the operation of other parts of an instrument.

A further object of my invention is to provide a vibration indicator that shall be simple and durable in construction, economical to manufacture and effective in its operation.

While the device of my invention may be employed for other purposes, it is particularly adapted for measuring the unbalanced moment of the rotors of dynamo-electric machines, relative to the vibration axis of the system as set forth in my copending application, Serial No. 736,458, filed Sept. 8, 1924, to which reference may be had for a more complete understanding of my present invention.

In sensitive vibration indicating devices, it has been attempted in various ways to reduce friction and other losses in the indicator itself to a minimum so that the device will more clearly and accurately indicate the magnitude of vibration of the device being tested.

Various features, such as the particular service for which the instruments are adapted, the location of the instruments, surrounding temperature conditions and other factors, must be taken into consideration in the provision of such device.

In the instant case, the device should be reasonably sturdy and free of the liability of damage during manipulation and operation in shop testing operations. However, it has many features suited to widely different applications in connection with which certain of the same considerations enter.

In practicing my invention, I substantially entirely eliminate frictionally engaging surfaces by the employment of a delicate torsional shaft element and the provision of an actuating member that transmits its force to the indicating element in such direction and through rolling substantially point contact portions, as to materially improve the operating characteristics of devices of this character.

Figure 1 of the accompanying drawings is a plan view, partially in elevation and partially in section, of a vibration indicator constructed in accordance with my invention, and Fig. 2 is a side view, partially in elevation and partially in section, of the structure shown in Fig. 1.

The device comprising, in general, a casing 1, which in a preferred form of my invention is omitted, a dial structure 2, a supporting structure 3, an indicating element 4 and an actuating element 5.

The casing 1, when employed, preferably comprises a sheet metal bottom wall member 7, a cylindrical metal side wall member 8, a transparent cover plate 9 and a retaining ring 10, for the plate 9. The bottom wall member 7 may be provided with an upturned perimetral edge 11 that is telescopingly related to an expanded lower perimetral portion 12 of the cylindrical member 8 and secured thereto, as by screws 14. The upper end of the cylindrical member 8 may be provided with an outwardly and inwardly bent flange 15 against which the transparent plate 9 is suitably held by the ring 10.

The dial structure 2 comprises a vertical standard portion 17 having horizontal dial portion 18 thereon and is suitably supported on block 20 which may constitute the sole support therefor or which may, in turn, be supported on the bottom of the casing 1.

The supporting structure 3 comprises a relatively long lower horizontal arm 21 that is mounted on the block 20, a relatively short horizontal upper arm 22 and a vertical portion 23 connected between the arms 21 and 22.

Oppositely disposed bearing members or studs 25 and 26 are provided in the arms 22 and 21, respectively, for supporting a resilient metal-strap shaft element 28 therebetween. The studs 25 and 26 are angularly-movably mounted in cylindrical bores in the arms 22 and 21 in such manner, that, by turning the same, the initial biased pressure between the pin 39 and the cup 35 may be adjusted and maintained in adjusted condition by set screws 27. The throat on stud 25 and a nut 29 permit the element 28 to be adjustably tensioned to tune the system to such frequency as seems most advantageous.

The indicating element 4 comprises a member 31 that is fixedly secured to the strap 28 and a pointer portion 32 that may be secured to a portion 33 of the member 31, as by rivets 34. The pointer portion 32 extends to a position over the dial structure 2.

The member 31 is provided with a relatively short rearwardly projecting portion having a side recess for the reception of a contact cup 35, the longitudinal axis of which lies in a plane substantially parallel to the plane of the element 28.

The actuating element 5 comprises an arm 36 that extends through an aperture 37 in the cylindrical side wall 8 of the casing 1 between a position (not shown) at which it is rigidly secured to a device being tested and a portion 38 opposite the cup 35 of the indicating element 4. The arm 36 is provided with a laterally projecting portion 39 having a round pointed outer end for engagement with the cup member 35 therein.

In the zero or neutral position of the parts indicated, the projection 39 is in position to impinge against the inner surface of the cup 35 in a direction substantially tangential to a circular path of movement of said inner surface, about the vertical center axis of the strap 28.

In setting up the device for operation, the arm 36 is preferably fixed in the vibrating part on which rotating parts are to be tested and the other parts of the instrument so adjusted as to have the projection 39 and the cup member 35 resiliently biased against each other in the zero or neutral position of the pointer 32, so that regardless of withdrawal or advance movements of the projection 39, these parts will remain in engagement.

In operation, since the strap 28 is fixed to the studs 25 and 26 which are stationary, when the arm 36 moves in response to vibrations of the machine being tested, the strap 28 will be twisted about its vertical axis to move the pointer portion 32 over the scale in accordance with the magnitude of the vibrations. During this movement, since the engaging portions of the elements 35 and 39 are disposed relatively close to the vertical axis of the strap 28, and disposed in the tangential relation above described, a rolling substantially point contact occurs therebetween. Thus there are no frictionally engaging surfaces at this position and, since there are no other parts of the instrument which frictionally engage, the instrument is free from losses from this cause.

While I have shown and described a particular form of my invention, changes may be effected therein without departing from the spirit and scope of the appended claims.

I claim as my invention:

1. A vibration indicator comprising a pivotally-movable indicating member having an intermediate neutral position, a vibration-responsive member movable substantially tangentially to a path of movement of the indicating member adjacent to the pivot point thereof and engaging the same in substantially single-point contact therewith and means for biasing the indicating member toward the actuating member to retain the members in engagement in all positions of the indicating member.

2. A vibration indicator comprising a pivoted indicating element embodying a pointer portion at one side of its pivot axis and a relatively short-arm portion at the opposite side of said axis including a rounded cup having its longitudinal axis substantially tangential to an arc about said pivot axis, an actuating member embodying an elongated portion extending substantially parallel to said longitudinal axis in its neutral position and adapted to move longitudinally and slightly angularly from said axis, said elongated portion having a rounded end engaging the bottom of said cup, and means for biasing said cup against said rounded end to retain the cup and end in engagement in all positions of the pointer.

3. A vibration indicator comprising an indicating member, a flexible pivot-shaft element for supporting the same, means for actuating the indicating member by torsionally twisting the shaft element, the actuating force being applied laterally to the shaft and the parts being constructed and related to prevent longitudinal bending of the shaft under the applied force, and means for independently adjusting the longitudinal and torsional tension of the shaft.

4. A vibration indicator comprising an indicating member, a flexible pivot-shaft element of flat-strap character for supporting the same, means for actuating the indicating member by torsionally twisting the shaft element, the actuating force being applied substantially parallel to the plane of the flat sides of the strip, and means for independently adjusting the longitudinal and torsional tension of the shaft.

5. A vibration indicator comprising an indicating element including a flexible-shaft portion, a vibration-responsive element for imparting actuating force to said indicating element substantially in said direction and means for independently adjusting the longitudinal and torsional tension of the shaft.

6. A vibration indicator comprising an indicating element including a flexible-shaft portion reinforced against lateral bending in a given direction, and a vibration-responsive element for imparting actuating force to said indicating element substantially in said direction, one of said elements embodying a portion of substantially cup-shape having a rounded inner bottom surface and the other having a round-pointed portion engaging said bottom surface.

7. A vibration indicator comprising a substantially flat strap tension element constituting a shaft, a pointer secured to an intermediate position thereof and extending radially therefrom, and means for mounting and adjusting the longitudinal tension of said element comprising longitudinally relatively movable members secured to the strap at opposite sides of said pointer, and means for adjusting the torsional tension of said element.

8. A vibration indicator comprising a supporting member of substantially U-shape, a substantially flat-strap tension element constituting a shaft disposed between and extending transversely to the legs of said member and means including a member movably mounted on one of said legs for mounting the strap and adjusting the longitudinal tension thereof.

In testimony whereof, I have hereunto subscribed my name this 4th day of June 1925.

WILLIAM E. TRUMPLER.